US008850022B2

(12) United States Patent
Hoffmann

(10) Patent No.: US 8,850,022 B2
(45) Date of Patent: Sep. 30, 2014

(54) ADJUSTMENT OF END USER RESPONSE TIMES ACCORDING TO USER EXPECTATIONS FOR SERVER APPLICATIONS UNDER LOAD

(75) Inventor: Martin Hoffmann, Heidelberg (DE)

(73) Assignee: SAG AG, Walldorf (DE)

( * ) Notice: Subject to any disclaimer, the term of this patent is extended or adjusted under 35 U.S.C. 154(b) by 55 days.

(21) Appl. No.: 13/281,654

(22) Filed: Oct. 26, 2011

(65) Prior Publication Data
US 2013/0111031 A1 May 2, 2013

(51) Int. Cl.
*G06F 15/173* (2006.01)
*G06F 9/50* (2006.01)

(52) U.S. Cl.
CPC .................................... *G06F 9/505* (2013.01)
USPC ........................ 709/226; 709/225; 709/223

(58) Field of Classification Search
USPC ......................................................... 709/226
See application file for complete search history.

(56) References Cited

U.S. PATENT DOCUMENTS

| 5,504,894 | A  | * | 4/1996  | Ferguson et al. ..................... 1/1 |
|-----------|----|---|---------|------------------------------------------|
| 6,108,700 | A  | * | 8/2000  | Maccabee et al. ............ 709/224 |
| 6,961,539 | B2 | * | 11/2005 | Schweinhart et al. ....... 455/12.1 |
| 6,970,929 | B2 | * | 11/2005 | Bae et al. ...................... 709/226 |
| 7,624,047 | B1 | * | 11/2009 | Round ........................... 705/26.1 |
| 7,870,568 | B2 | * | 1/2011  | Bernardin et al. ............ 719/328 |
| 2007/0143290 | A1 | * | 6/2007 | Fujimoto et al. ................. 707/9 |
| 2009/0157834 | A1 | * | 6/2009 | Krishnaswamy ............ 709/206 |
| 2009/0183016 | A1 | * | 7/2009 | Chan et al. .................... 713/323 |

OTHER PUBLICATIONS

CISCO. "Congestion Management Overview". Oct. 2007. QC p. 41-54.*

* cited by examiner

*Primary Examiner* — Douglas W Owens
*Assistant Examiner* — Monica C King
(74) *Attorney, Agent, or Firm* — Kenyon & Kenyon LLP

(57) ABSTRACT

A system and method are described herein that prioritize users into waiting queues based on the previously measured end user response time for each user or a user's expectancy for a shorter response time. A user profile may be generated for each user based on the user's expectancy, performance needs, or attributes about the user. The system and method may provide access to a server for each user based on their placement and prioritization in each queue, creating distinct server and/or end user response times for distinct users.

23 Claims, 2 Drawing Sheets

ADJUSTMENT OF END USER RESPONSE TIMES ACCORDING TO USER EXPECTATIONS FOR SERVER APPLICATIONS UNDER LOAD

FIELD OF THE INVENTION

The present invention relates to adjusting an end user response wait time for a server application. The present invention further relates to determining a priority for users using a server application under load. The present invention further relates to adjusting a user response time based on a user's status in a prioritized queue.

BACKGROUND INFORMATION

An end user response time is an important consideration for current end users of a server application and is generally related to the response time of the server itself. An end user response time may be classified as a time interval between when an end user at a terminal enters a request for a response from a server and the instant in which the response is received at the end user terminal. In contrast to server response time, an end user response time incorporates the network time and client processing times such as client rendering or client processing time, thus reflecting the response time as perceived by the end user. A response time for an end user can be delayed under a high load where a high volume of users are logged on to a given server, particularly in instances when the number of users approaches the number of users the server can handle. For a server that is overburden by too many users, the server responds to users equally slow due to all the requests going to the same queue.

A slow server response time can significantly slow down end user response time, which is problematic and can create a number of implications for end users. Users that maintain higher expectations for the run time of a server application may demand a faster end user response time to accomplish their performance expectations. Such users may require a faster performance based on such factors as necessity to run certain applications, necessity for work, age, or other qualifications.

Conversely, an equally slow server response time for all users may not result in an equal response time for all end users. Users connected to the same server may have different end user response times based on, for example, their connection to a network (such as using Ethernet or wireless) or on the specific computing device and interface being used at the user end terminal. For example, users using mobile clients will have a significantly longer wait time than a user using a desktop computer, even though the server response time is the same for both units.

Increased user response times are a higher source of frustration particularly for users that maintain a higher expected performance of the server application. Conversely, users that do not have a high expectation of the performance of the server application are likely unaffected by an increasingly delayed server response time. These users may not perceive a delay in the server response, and if their systems do not require a fast response time, it may not be necessary to have the same server response time for these users as needed for high expectancy users. Low expectancy users may also have a longer response time without actually perceiving a longer response time is occurring; this may occur, for example, in instances where internet service providers ("ISPs") have a service level agreement with measurable thresholds that are not met for all the users. Therefore, it may be advantageous to separate high expectancy users from moderate and low expected performance users, to reduce the end user response times of the high expectancy users.

Thus there remains a need in the art, for a system and method which allows for the customizability and adjustment of user response times based on user needs and expectations. There also remains a need in the art, for system and method which allows for the adjustment of user response times independent of server response times.

SUMMARY OF THE INVENTION

A system and method are described that prioritize users into waiting queues based on a user's expectancy for a shorter response time. A user profile may be generated for each user based on the user's expectancy, performance needs, or attributes about the user. The system and method may provide access to a server to each user based on their placement and prioritization in each queue, creating distinct user response times for distinct users.

In particular, the exemplary embodiments and/or exemplary methods of the present invention are directed to a method for adjusting an end user response time for a user accessing a server under load, the method comprising: receiving a user request from a user terminal; allocating the user request into a request queue; retrieving a user profile corresponding to the user from a user database; determining a priority level for the user profile; assigning the user request to one of at least two waiting queues based on the determined priority level; and transmitting the user request to a business application server in accordance to a determined ratio between the at least two waiting queues.

The exemplary embodiments and/or exemplary methods of the present invention further provide for the foregoing method in which the user request is transmitted from a client application on the user terminal.

The exemplary embodiments and/or exemplary methods of the present invention further provide for the foregoing method for identifying the user corresponding to the user request by a user prioritization server.

The exemplary embodiments and/or exemplary methods of the present invention further provide for the foregoing method in which the user profile is retrieved by a user prioritization server.

The exemplary embodiments and/or exemplary methods of the present invention further provide for the foregoing method in which the priority level is determined by a predetermined priority clustering.

The exemplary embodiments and/or exemplary methods of the present invention further provide for the foregoing method in which the priority level is determined by a measurement of the user's end user response time and developing a performance profile for the user.

The exemplary embodiments and/or exemplary methods of the present invention further provide for a method for adjusting a user response time for a user to a server under load, the method comprising: receiving a user request from a user terminal; allocating the user request into a request queue; retrieving a user profile corresponding to the user from a user database; determining a priority level for the user profile; assigning the user request to one of at least one higher priority waiting queue and at least one lower priority waiting queue; and transmitting the user request to a business application server in accordance to a determined ratio between the at least one higher priority waiting queue and the at least one lower priority waiting queue.

The exemplary embodiments and/or exemplary methods of the present invention further provide for the foregoing method in which the user request is transmitted from a client application on the user terminal.

The exemplary embodiments and/or exemplary methods of the present invention further provide for the foregoing method for identifying the user corresponding to the user request by a user prioritization server.

The exemplary embodiments and/or exemplary methods of the present invention further provide for the foregoing method in which the user profile is retrieved by a user prioritization server.

The exemplary embodiments and/or exemplary methods of the present invention further provide for the foregoing method in which the priority level is determined by a predetermined priority clustering.

The exemplary embodiments and/or exemplary methods of the present invention further provide for the foregoing method in which the priority level is determined by a measurement of the user's end user response time and developing a performance profile for the user.

The exemplary embodiments and/or exemplary methods of the present invention further provide for a server response system for adjusting a user response time for a user to a server under load, the system comprising: at least one user terminal transmitting a user request to a server; and the server providing the following: receive the user request; allocate the user request into a request queue; retrieve a user profile corresponding to the user from a user database; determine a priority level for the user profile; assign the user request to one of at least two waiting queues based on the determined priority level; transmit the user request to a business application server in accordance to a determined ratio between the at least two waiting queues.

The exemplary embodiments and/or exemplary methods of the present invention further provide for the foregoing system in which the user request is transmitted from a client application on the user terminal.

The exemplary embodiments and/or exemplary methods of the present invention further provide for the foregoing system in which the server is configured to identify the user corresponding to the user request by a user prioritization server.

The exemplary embodiments and/or exemplary methods of the present invention further provide for the foregoing system in which the user profile is retrieved by a user prioritization server.

The exemplary embodiments and/or exemplary methods of the present invention further provide for the foregoing system in which the priority level is determined by a predetermined priority clustering.

The exemplary embodiments and/or exemplary methods of the present invention further provide for the foregoing system in which the priority level is determined by a measurement of the user's end user response time and developing a performance profile for the user.

The exemplary embodiments and/or exemplary methods of the present invention further provide for a server response system for adjusting a user response time for a user to a server under load, the system comprising: at least one user terminal transmitting a user request to a server; and the server providing the following: receive the user request; allocate the user request into a request queue; retrieve a user profile corresponding to the user from a user database; determine a priority level for the user profile; assign the user request to one of at least one high priority waiting queue and at least one low priority waiting queue; transmit the user request to a business application server in accordance to a determined ratio between the at least one high priority waiting queue and the at least one low priority waiting queue.

The exemplary embodiments and/or exemplary methods of the present invention further provide for the foregoing system in which the user request is transmitted from a client application on the user terminal.

The exemplary embodiments and/or exemplary methods of the present invention further provide for the foregoing system in which the server is configured to identify the user corresponding to the user request by a user prioritization server.

The exemplary embodiments and/or exemplary methods of the present invention further provide for the foregoing system in which the user profile is retrieved by a user prioritization server.

The exemplary embodiments and/or exemplary methods of the present invention further provide for the foregoing system in which the priority level is determined by a predetermined priority clustering.

The exemplary embodiments and/or exemplary methods of the present invention further provide for the foregoing system in which the priority level is determined by a measurement of the user's end user response time and developing a performance profile for the user.

DETAILED DESCRIPTION

The subject invention will now be described in detail for specific preferred embodiments of the invention, it being understood that these embodiments are intended only as illustrative examples and the invention is not to be limited thereto.

Providing similar end user response times to low and high expectancy users may be inefficient and lead to unsatisfactory end user response times for high expectancy users. Exemplary embodiments of the present invention provide a system and method that may prioritize users into waiting queues based on a user's expectancy for a shorter response time. A user profile may be generated for each user based on the user's expectancy, performance needs, or attributes about the user. The system and method may provide access to a server to each user based on their placement and prioritization in each queue, creating distinct user response times for distinct users.

Figure 1:
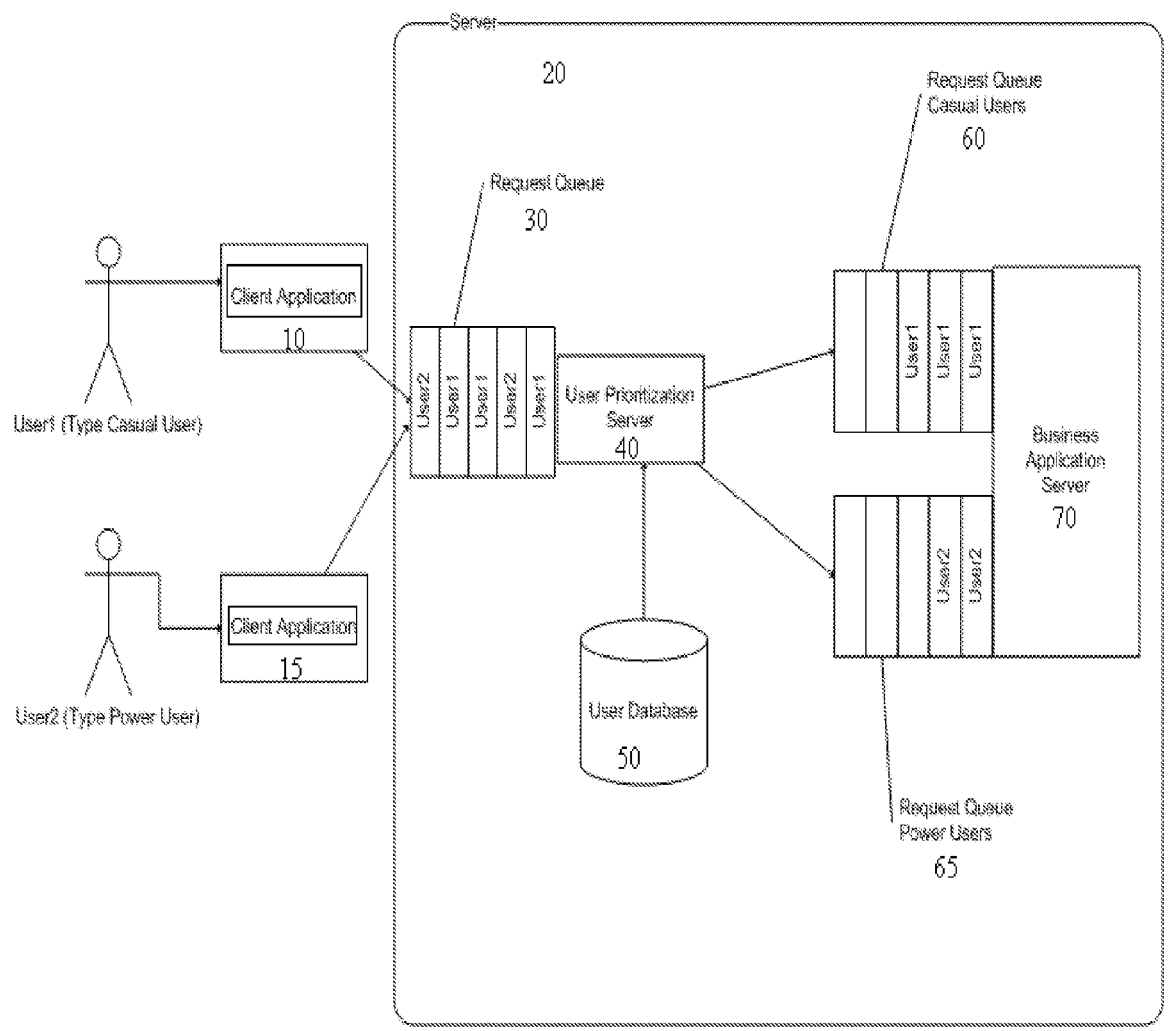
FIG. 1 is a system diagram of multiple users connected remotely to a server according to the present invention.

FIG. 1 illustrates a system diagram of multiple users connecting to a server. In FIG. 1, users may connect to server 20, through user terminals 10 and 15. Each user terminal may contain a display or monitor that displays a client application. The client application displayed on each user terminal may connect each user to server 20. Server 20 may be implemented remotely using processing circuits or devices or combinations thereof, such as, for example, a central processing unit (CPU) of a personal computer (PC) or other workstation processor. User terminals 10, 15 may be embodied, for example, as a desktop, laptop, hand-held device, personal digital assistant (PDA), television set-top Internet appliance, mobile telephone, smart phone, iPod™, iPhone™, iPad™, etc., or as a combination of one or more thereof, or other comparable device.

Server 20 may include request queues 30, 60, and 65, user prioritization server 40, user database 50, and business application server 70. Request queue 30 may receive server requests from users and organize each received user request into a queue. User database 50 may collect and store generated user profiles for each of the users. Each user profile may contain information including, but not limited to, type of connecting device, computer usage, age of user, user demographic, user location, or any other behavior or identifying data of a user. User database 50 may communicate with user prioritization server 40 and may transmit user profile or user profile information to user prioritization server 40 based on the users in request queue 30. User prioritization server may identify the user or user type in request queue 30 before retrieving the user profile from user database 50.

The users profiles stored in user database 50 may be clustered by algorithms into different priority groups in accordance with determined criteria. In an example embodiment, a performance profile may be generated for each user based on a measured end user response time. The end user response time may be measured on the user terminal by instrumenting code executed on the user terminal (or client) during a user request and transferring the time to server 20 asynchronously with the user request or during a subsequent request made by the same user. This performance profile may be stored in user database 50 and may be maintained by the database. Subsequent measurements may be made in order to determine a stable performance profile of the user, and once a stable performance profile of a user is determined, no instrumenting may be further required for the user. Instrumentation by server 20 may be turned on or off for specific users, based on whether a stable performance profile exists for the user. Turning off instrumentation for certain may also assist in the reduction of overhead for the system. Users that have a stable performance profile stored in user database 50 may be allocated to a different priority queue upon a subsequent user request. A slower measured end user response time may result in placing a user in a slow priority group in a waiting queue. Conversely, a faster measured response time may result in placing a user in a faster priority group in a waiting queue.

In an alternate embodiment, a user may be placed in a faster priority group even if the user's user terminal has a slower response time. For example, server 20 may instrument a user connecting to the server via a desktop computer and determine that the user's user computer has an end user response time of 800 ms, 500 ms of which may be the server response time. Conversely, another user may connect to server 20 using a mobile device. Server 20 may instrument the user's mobile device and determine that the user's end user response time is 1.2 s due to their connection through a mobile network. If business application server 70 has a service level agreement ("SLA") of 1 s, mobile users that are connecting to server 20 and have an end user response time of 1.2 s may be in violation of the level agreement. Exceeding the service level agreement may be exceedingly expensive for a service provider, and therefore there may be an incentive to prevent this. A higher priority rank may be given to the mobile device user in order to lower their end user response time to less than 1 s, and prevent the mobile user from waiting too long in the server's queue. In this embodiment, the desktop computer may have an end user response time that is greater than 800 ms, but may be acceptable under the service level agreement threshold of 1 s.

In another embodiment, user profiles in user database 50 may be clustered according to algorithms based on a determination of a user's expectation for an end user response time or willingness to wait, and may be prioritized according to a low expectancy and a high expectancy. Many low expectancy users may not have the same expectations for the speed of a server application in contrast to high expectancy users, and therefore may be separately clustered. Users may be prioritized based on user expectation or a user's willingness to wait for a slower response time and these determinations may be made by a number of factors.

User factors that may lead to a determination of a user's expectancy or willingness to wait may be made statistically or dynamically. Statistical factors may be provided based on an input of the user itself. An example of a statistical user factor may include a user's age, which may be provided by the user. An older user may be more patient and willing to wait for a slower end user response than a younger user who may be seeking a quicker gratification. An older user may also personally have a slower reaction time which may deem the requirement for a faster end user response time unnecessary. A user's familiarity with technology may also be a statistical factor in determining the user's expectancy and willingness to receive a slower end user response time. A user that is well versed in technology may have a higher expectation for an end user response time than a user that is not, even if the user is connecting to the server through a device that would otherwise be slower. A determination can be made as to whether a user is a power user, one who is able to use the advanced features of a given application, or simply a normal user. This determination may be both dynamically or statistically based on a user's input.

Clustering of users into priority groups may also be made according to dynamically measured events. Such events may include a user's behavior such as how fast a user clicks (clicks per minute) or how fast input is entered via a keyboard or character input. Users that may click at a higher speed or frequency, or may more frequently and quickly enter words into user terminals 10, 15, may be more likely to have a higher expectation for a quicker end user response time. Therefore a user's own behavior may assist in determining a priority group.

User profiles that have been clustered using determinations of a user's age, behavior, patience, or expectations, may further be prioritized using the aforementioned method of measuring end user response time (including network and client processing times) and developing a stable performance profile for each user. This may serve to separate users that may initially be combined into the same priority group, for example, users that are of the same age, but may actually require different end user response times and should be placed in separate priority queues. Conversely, users that have been prioritized only based on their performance profiles, may be further clustered based on their behavior and expectations, as a user that has a device that has a low measured end user response time may not personally require one.

The user profiles may be clustered in user database 50 based on their determined priority. User prioritization server 40 may determine the priority of the next user of the user request in request queue 30 and then, based on a determined priority, forward the user request to waiting queue 60 or 65. Although only waiting queue 60 and 65 may be illustrated in FIG. 1, it should be understood that for all embodiments, there may be more than two waiting queues. In FIG. 1, waiting queue 60 may correspond to a queue for user requests from users categorized by the system and denoted by user prioritization server 40 as casual users. These casual users may have a lower expectancy for server performance or may not require a fast end user response time. Waiting queue 65 may contain all user requests that were determined by user prioritization server 40 to be from power users.

User requests in waiting queues 60 and 65 may alternately be transmitted to business application server 70. A request from a power user, determined to have a higher priority than a casual user, may be transmitted to business application server 70 before a user request from a casual user. A design selection may be made for the ratio of high priority user requests to be transmitted to low priority user requests transmitted to business application server 70. For example, in FIG. 1, where two waiting queues, 60 and 65, are illustrated, a 2:1 ratio may be selected for power user request to casual users. Namely, for each two user requests that are transmitted from waiting queue 65 to business application server 70, one user request may be transmitted from waiting queue 60 to business application server 70.

The ratio of the priority user requests admitted from each queue may also be adjusted or adapted according to the volume in each waiting queue. For example, in FIG. 1, if a ratio of 2:1 for power users to casual users for transmittal is selected, but there are 5 times as many user requests by casual users in waiting queue 60 than there are user requests by power users in waiting queue 65, the ratio for transmittal may automatically be decreased to 1:1 to reduce the volume of user requests in queue 60.

Figure 2:
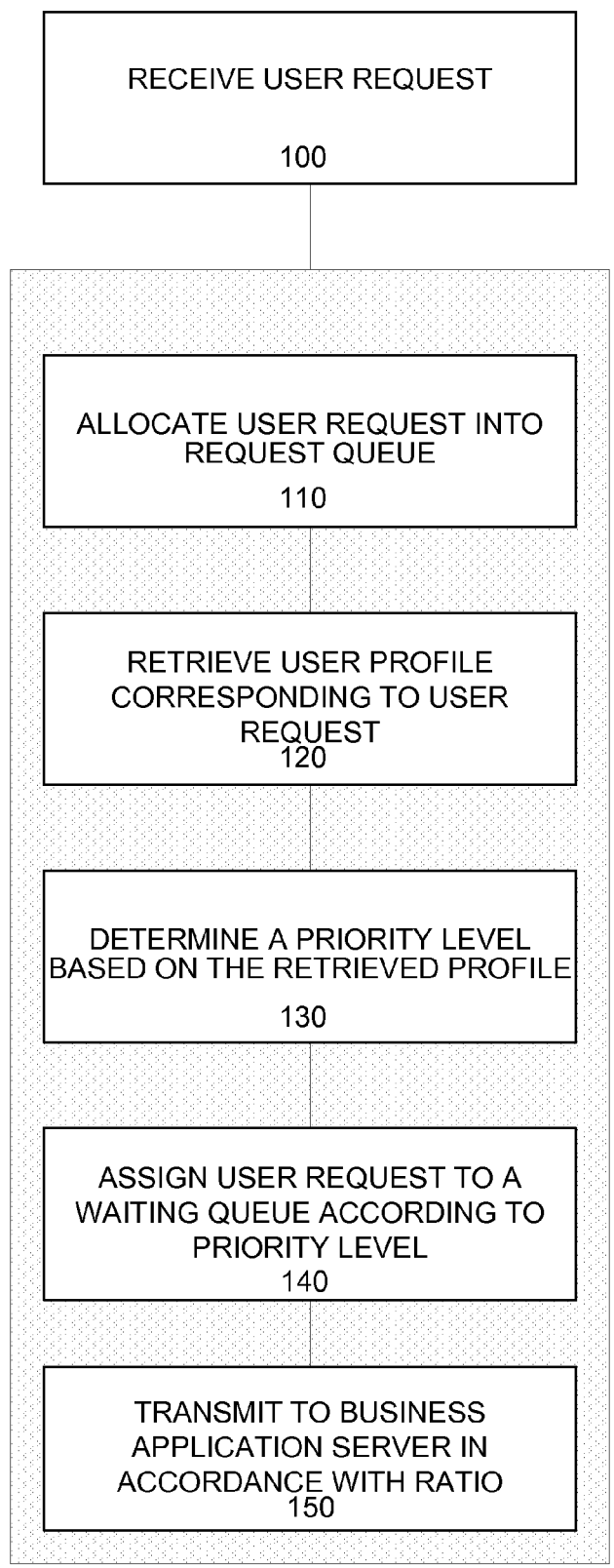
FIG. 2 is a process flow diagram of the process of server during operation according to the present invention.

FIG. 2 illustrates a process flow diagram of the server during operation. During operation, a user request may be transmitted by a user on a user terminal 10, 15, to server 20 via a client application on the user terminal. In step 100, server 20 may receive the user request from the client application. In step 110, server 20 may allocate the user request from user terminal 10, 15 to request queue 30. Subsequently, user prioritization server 40 may receive the next user request in request queue 30. In step 120, user prioritization server 40 may identify the user corresponding to the user request and request the user profile from user database 50. User database 50 may transmit the user profile back to user prioritization server 40 which may determine a priority level in step 130 for the user based on a predetermined priority clustering.

In step 140, the user request may be assigned to a waiting queue based on a determined priority level. In FIG. 1, casual users assigned to a lower priority level may be assigned to waiting queue 60, while power users assigned to a higher priority level may be assigned to waiting queue 65. In step 150, the user requests may be transmitted to business application server 70 in accordance with a designated ratio between the waiting queues.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for adjusting an end user response time for a user accessing a server under load, the method comprising:
   receiving a user request from a user terminal;
   allocating the user request into a request queue;
   retrieving a user profile corresponding to the user from a user database;
   determining a priority level for the user profile, wherein the priority level is based on a performance profile created from end user response times detected at the user terminal and at least a service level agreement between the user and a service provider specifying acceptable end user response times, wherein the performance profile is continuously adjusted based on the detected end user response times until the performance profile is stable, and the detection of end user response times by the user terminal is turned off once the performance profile is stable, wherein the end user response times includes a response time as perceived by the end user, including respective client rendering times and client processing times by the user terminal;
   assigning the user request to one of at least two waiting queues based on the determined priority level; and
   transmitting the user request to a business application server in accordance to a determined ratio between the at least two waiting queues.

2. The method according to claim 1, wherein the user request is transmitted from a client application on the user terminal.

3. The method according to claim 1, further comprising:
   identifying the user corresponding to the user request by a user prioritization server.

4. The method according to claim 1, wherein the user profile is retrieved by a user prioritization server.

5. The method according to claim 1, wherein the priority level is determined by a predetermined priority clustering.

6. A method for adjusting an end user response time for a user accessing a server under load, the method comprising:
   receiving a user request from a user terminal;
   allocating the user request into a request queue;
   retrieving a user profile corresponding to the user from a user database;
   determining a priority level for the user profile, wherein the priority level is based on a performance profile created from end user response times detected at the user terminal and at least a service level agreement between the user and a service provider specifying acceptable end user response times, wherein the performance profile is continuously adjusted based on the detected end user response times until the performance profile is stable, and the detection of end user response times by the user terminal is turned off once the performance profile is stable, wherein the end user response times includes a response time as perceived by the end user, including respective client rendering times and client processing times by the user terminal;
   assigning the user request to one of at least one higher priority waiting queue and at least one lower priority waiting queue; and
   transmitting the user request to a business application server in accordance to a determined ratio between the at least one higher priority waiting queue and the at least one lower priority waiting queue.

7. The method according to claim 6, wherein the user request is transmitted from a client application on the user terminal.

8. The method according to claim 6, further comprising:
   identifying the user corresponding to the user request by a user prioritization server.

9. The method according to claim 6, wherein the user profile is retrieved by a user prioritization server.

10. The method according to claim 6, wherein the priority level is determined by a predetermined priority clustering.

11. A server response system for adjusting an end user response time for a user to a server under load, the system comprising:
    at least one user terminal transmitting a user request to a server; and
    the server providing the following:
       receive the user request;
       allocate the user request into a request queue;
       retrieve a user profile corresponding to the user from a user database;
       determining a priority level for the user profile, wherein the priority level is based on a performance profile created from end user response times detected at the user terminal and at least a service level agreement between the user and a service provider specifying acceptable end user response times, wherein the performance profile is continuously adjusted based on the detected end user response times until the performance profile is stable, and the detection of end user response times by the user terminal until is turned off once the performance profile is stable, wherein the end user response times includes a response time as perceived by the end user, including respective client rendering times and client processing times by the user terminal;

assign the user request to one of at least two waiting queues based on the determined priority level; and transmit the user request to a business application server in accordance to a determined ratio between the at least two waiting queues.

12. The system according to claim 11, wherein the user request is transmitted from a client application on the user terminal.

13. The system according to claim 11, wherein the server is configured to identify the user corresponding to the user request by a user prioritization server.

14. The system according to claim 11, wherein the user profile is retrieved by a user prioritization server.

15. The system according to claim 11, wherein the priority level is determined by a predetermined priority clustering.

16. A server response system for adjusting an end user response time for a user to a server under load, the system comprising:

at least one user terminal transmitting a user request to a server; and the server providing the following:
receive the user request;
allocate the user request into a request queue;
retrieve a user profile corresponding to the user from a user database;
determining a priority level for the user profile, wherein the priority level is based on a performance profile created from end user response times detected at the user terminal and at least a service level agreement between the user and a service provider specifying acceptable end user response times, wherein the performance profile is continuously adjusted based on the detected end user response times until the performance profile is stable, and the detection of end user response times by the user terminal is turned off once the performance profile is stable, wherein the end user response times includes a response time as perceived by the end user, including respective client rendering times and client processing times by the user terminal;

assign the user request to one of at least one high priority waiting queue and at least one low priority waiting queue; and transmit the user request to a business application server in accordance to a determined ratio between the at least one high priority waiting queue and the at least one low priority waiting queue.

17. The system according to claim 16, wherein the user request is transmitted from a client application on the user terminal.

18. The system according to claim 16, wherein the server is configured to identify the user corresponding to the user request by a user prioritization server.

19. The system according to claim 16, wherein the user profile is retrieved by a user prioritization server.

20. The system according to claim 16, wherein the priority level is determined by a predetermined priority clustering.

21. The method of claim 1, wherein the determined priority level for the user profile is based on an age of the user.

22. The method of claim 1, wherein the determined priority level for the user profile is based on a frequency of user input by the user.

23. The method of claim 1, wherein detected end user response times are transmitted asynchronously through subsequent user requests from the user terminal.

* * * * *